US009676131B2

(12) United States Patent
Lehrter et al.

(10) Patent No.: US 9,676,131 B2
(45) Date of Patent: *Jun. 13, 2017

(54) PAPER-LIKE FILM AND PROCESS FOR MAKING IT

(71) Applicants: Mary Ruth Lehrter, Cincinnati, OH (US); Adam Pacelli, Brooklyn, NY (US)

(72) Inventors: Mary Ruth Lehrter, Cincinnati, OH (US); Adam Pacelli, Brooklyn, NY (US)

(73) Assignee: Greenrock, Ltd., Cincinnati, OH (US)

( * ) Notice: Subject to any disclaimer, the term of this patent is extended or adjusted under 35 U.S.C. 154(b) by 149 days.

This patent is subject to a terminal disclaimer.

(21) Appl. No.: 14/597,605

(22) Filed: Jan. 15, 2015

(65) Prior Publication Data
US 2015/0123302 A1 May 7, 2015

Related U.S. Application Data

(60) Continuation of application No. 14/543,375, filed on Nov. 17, 2014, which is a division of application No.
(Continued)

(51) Int. Cl.
B29C 47/00 (2006.01)
B29C 47/20 (2006.01)
(Continued)

(52) U.S. Cl.
CPC ...... B29C 47/0057 (2013.01); B29C 47/0021 (2013.01); B29C 47/0026 (2013.01);
(Continued)

(58) Field of Classification Search
None
See application file for complete search history.

(56) References Cited

U.S. PATENT DOCUMENTS 3,903,234 A 9/1975 Ikeda et al.
4,082,880 A 4/1978 Zboril
(Continued)

FOREIGN PATENT DOCUMENTS

EP 0 021 420 A1 1/1981
EP 0 078 738 A1 5/1983
(Continued)

OTHER PUBLICATIONS

PCT/US2011/020894 PCT International Search Report and Written Opinion dated Sep. 27, 2011 on corresponding PCT application (10 pages).
(Continued)

Primary Examiner — Monica Huson
(74) Attorney, Agent, or Firm — Hasse & Nesbitt LLC; Donald E. Hasse

(57) ABSTRACT

A micro-voided film comprising high density polyethylene having a molecular weight of at least about 200,000, and low aspect ratio filler having a mean particle size from about 1 to about 25 microns. The film has a thickness of from about 0.1 to about 20 mils and a void fraction of from about 0.60 to about 0.75. The micro-voided film is made by a process comprising extruding the composition into a film having a thickness of from about 20 to about 200 mils, and orienting the extruded film using a high stalk, blown film process. The process produces a stabilized high stalk for increasing the production rate of blown, high molecular weight polyethylene, while increasing the film's physical and mechanical properties. The high stalk can be stabilized by application of high velocity, low volume flow rate of air over the interior and exterior surfaces of the extruded film.

14 Claims, 1 Drawing Sheet

Related U.S. Application Data

13/004,840, filed on Jan. 11, 2011, now Pat. No. 8,889,047.

(60) Provisional application No. 61/294,372, filed on Jan. 12, 2010.

(51) Int. Cl.
| | | |
|---|---|---|
| B29C 67/20 | (2006.01) | |
| C08J 5/18 | (2006.01) | |
| B29C 55/14 | (2006.01) | |
| C08J 9/228 | (2006.01) | |
| B29C 47/88 | (2006.01) | |
| B29L 23/00 | (2006.01) | |
| B29K 23/00 | (2006.01) | |
| B29K 509/00 | (2006.01) | |

(52) U.S. Cl.
CPC ........... *B29C 47/20* (2013.01); *B29C 55/143* (2013.01); *B29C 67/20* (2013.01); *C08J 5/18* (2013.01); *C08J 9/228* (2013.01); *B29C 47/883* (2013.01); *B29C 47/8835* (2013.01); *B29C 2947/92647* (2013.01); *B29C 2947/92704* (2013.01); *B29K 2023/065* (2013.01); *B29K 2509/00* (2013.01); *B29K 2995/005* (2013.01); *B29K 2995/0053* (2013.01); *B29L 2023/001* (2013.01); *C08J 2201/03* (2013.01); *C08J 2205/044* (2013.01); *C08J 2323/06* (2013.01)

(56) References Cited

U.S. PATENT DOCUMENTS

| | | |
|---|---|---|
| 4,095,012 A | 6/1978 | Schirmer |
| 4,156,666 A | 5/1979 | Odate et al. |
| 4,219,453 A | 8/1980 | Sakurai et al. |
| 4,318,950 A | 3/1982 | Takashi et al. |
| 4,340,639 A | 7/1982 | Toyoda et al. |
| 4,341,827 A | 7/1982 | Austen et al. |
| 4,359,497 A | 11/1982 | Magder et al. |
| 4,606,879 A | 8/1986 | Cerisano |
| 4,705,813 A | 11/1987 | Ito et al. |
| 5,008,296 A | 4/1991 | Antoon, Jr. et al. |
| 5,011,698 A | 4/1991 | Antoon, Jr. et al. |
| 5,254,617 A | 10/1993 | Inoue et al. |
| 5,506,046 A | 4/1996 | Andersen et al. |
| 5,552,011 A | 9/1996 | Lin |
| 5,582,670 A | 12/1996 | Andersen et al. |
| 5,681,523 A | 10/1997 | Cobler et al. |
| 5,759,675 A | 6/1998 | Hamada et al. |
| 5,945,210 A | 8/1999 | Senba et al. |
| 6,013,151 A | 1/2000 | Wu et al. |
| 6,086,987 A | 7/2000 | Yamanaka et al. |
| 6,156,845 A | 12/2000 | Saito et al. |
| 6,280,680 B1 | 8/2001 | Liang |
| 6,682,775 B2 | 1/2004 | Calhoun et al. |
| 6,838,403 B2 | 1/2005 | Tsai et al. |
| 6,838,493 B2 | 1/2005 | Williams et al. |
| 7,488,763 B2 | 2/2009 | Ushiku et al. |
| 8,889,047 B2 * | 11/2014 | Lehrter ............... B29C 47/0026 264/45.3 |
| 2002/0132107 A1 | 9/2002 | O'Brien et al. |
| 2002/0156193 A1 | 10/2002 | Tau et al. |
| 2003/0134106 A1 | 7/2003 | Ramesh et al. |
| 2005/0098918 A1 | 5/2005 | Liang |
| 2006/0167169 A1 | 7/2006 | Arana |
| 2010/0204379 A1 | 8/2010 | Pira |

FOREIGN PATENT DOCUMENTS

| | | |
|---|---|---|
| EP | 0 111 287 A2 | 6/1984 |
| EP | 0855420 A2 | 7/1998 |
| EP | 0 945 244 A1 | 9/1999 |
| JP | 57-045031 | 3/1982 |
| JP | 58-212918 | 12/1983 |
| JP | 59-071825 | 4/1984 |
| JP | 59-136224 | 8/1984 |
| JP | 59-171620 | 9/1984 |
| JP | 62-053345 | 3/1987 |
| JP | 07-308970 | 11/1995 |
| WO | WO 94/06849 A1 | 3/1994 |
| WO | WO 02/102593 A1 | 12/2002 |
| WO | 2005005129 A1 | 1/2005 |
| WO | 2006107125 A1 | 10/2006 |
| WO | 2010093368 A1 | 8/2010 |

OTHER PUBLICATIONS

Extended European Search Report and Opinion dated Jul. 30, 2015, for corresponding European Patent Application No. 11733280.9 (7 pages).

* cited by examiner

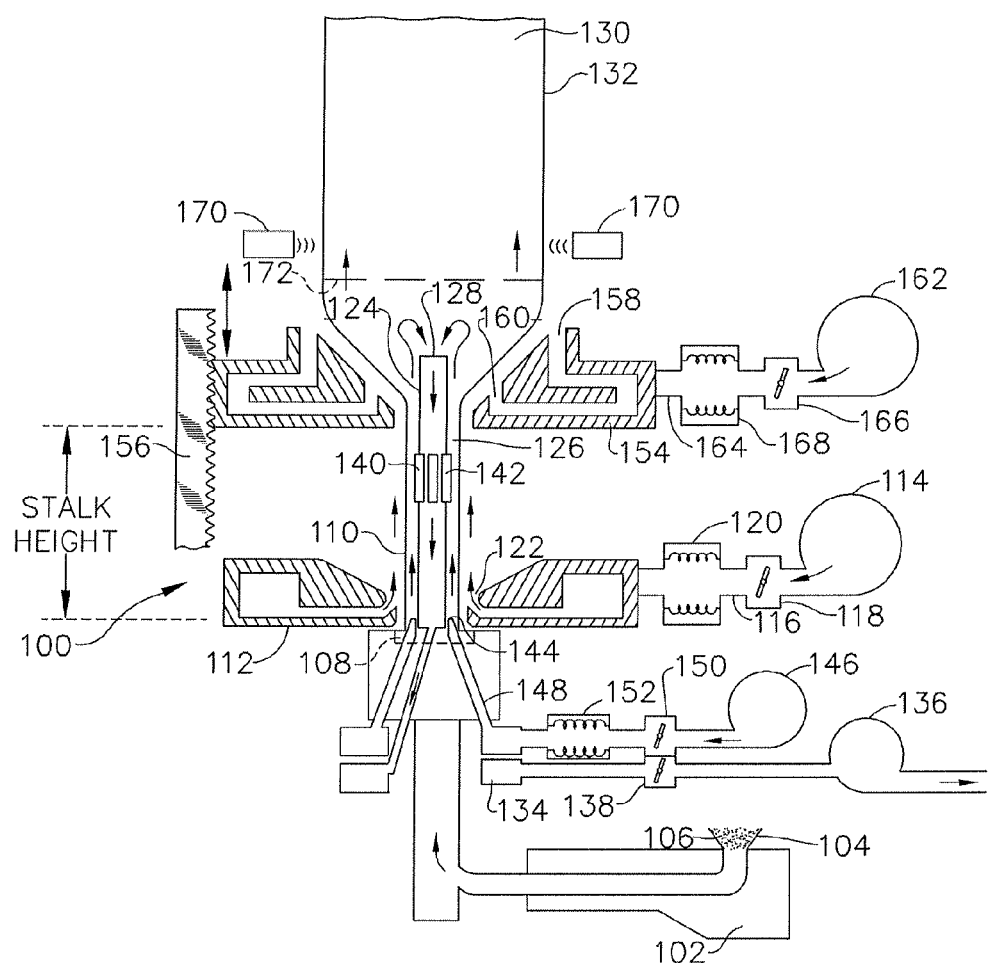

PAPER-LIKE FILM AND PROCESS FOR MAKING IT

CROSS-REFERENCE TO RELATED APPLICATION

This application is a continuation of pending U.S. application Ser. No. 14/543,375 filed on Nov. 17, 2014, which is a divisional of U.S. Pat. No. 8,889,047 issued on Nov. 18, 2014, and claims the benefit of U.S. Provisional Application No. 61/294,372, filed Jan. 12, 2010, incorporated herein by reference their entirety.

FIELD OF THE INVENTION

The present invention relates to a paper-like film comprising high density polyethylene and low aspect ratio, inorganic mineral filler material, and a process for making the film. More particularly, the invention relates to a micro-voided film made by extruding the composition through a circular die, and then orienting the film using a high stalk, blown film process.

BACKGROUND OF THE INVENTION

Synthetic papers comprising polyethylene and inorganic mineral fillers are known in the art. For example, U.S. Pat. No. 6,280,680, Liang, is said to provide environmentally friendly paper comprising 56-80% of inorganic mineral powders, 43-18% of polyethylene, and 1-2% of additives. The paper is made by a process using at least of one extruder and a forming mold having a circular die.

U.S. Pat. No. 4,606,879, Cerisano, discloses polymer films made using a high stalk, blown film extrusion process said to provide increased production rates and improved film physical and mechanical properties.

Micro-voided films produced by stretching mineral filled polymer compositions are disclosed in WO 94/06849, Bergevin et al. The films are said to have paper-like qualities of opacity, whiteness and printability, with improved flexural stiffness.

While the above paper-like films may be useful as described therein, there is a continuing need for thin, paper-like films that can be produced at higher yields than typically obtained using prior art processes.

SUMMARY OF THE INVENTION

The present invention relates to a micro-voided film comprising, by weight, i) from about 20% to about 60% of high density polyethylene having a molecular weight of at least about 200,000, and ii) from about 40% to about 80% of low aspect ratio filler having a mean particle size from about 1 to about 25 microns, wherein the weight ratio of the low aspect ratio filler to the polyethylene is at least about 0.7, said film having a having a thickness of from about 0.1 to about 20 microns and a void fraction of from about 0.60 to about 0.75.

The invention also relates to a process for making a micro-voided film, comprising: a) compounding into pellets or granules having an at least substantially homogeneous composition comprising, by weight, i) from about 20% to about 60% of high density polyethylene having a molecular weight of at least about 500,000 and a melt index of less than 0.2 dg/min, and ii) from about 40% to about 80% of low aspect ratio filler having a mean particle size from about 1 to about 25 microns, wherein the weight ratio of the low aspect ratio filler to the polyethylene is at least about 0.7; b) extruding the composition into a film having a thickness of from about 20 to about 200 mils; and c) orienting said extruded film using a high stalk, blown film process, the resulting film having a thickness of from about 0.1 to about 20 mils and a void fraction of from 0.60 to about 0.75 and a density of from about 0.40 to about 0.70 g/cm$^3$, wherein the voids are in the interior of the film.

In one embodiment, the invention relates to a process for making a micro-voided film, comprising: a) compounding into pellets or granules having an at least substantially homogeneous composition comprising, by weight, i) from about 20% to about 60% of high density polyethylene having a molecular weight of at least about 500,000 and a melt index of less than 0.2 dg/min, and ii) from about 40% to about 80% of low aspect ratio filler having a mean particle size from about 1 to about 25 microns, wherein the weight ratio of the low aspect ratio filler to the polyethylene is at least about 0.7; b) extruding the composition into a progressively advancing unexpanded tubular film having a thickness of from about 20 to about 200 mils and having a substantially uniform first diameter about a cylinder arranged along a longitudinal axis over a predetermined distance; c) applying a first gas stream over the exterior surface of said tubular film; d) applying a second gas stream over the interior surface of said tubular film within an annular region formed between said cylinder and the interior surface of said tubular film; e) controlling the velocity and volume flow rate of said first and second gas streams over said unexpanded tubular film over said predetermined distance for stabilizing said tubular film by preventing the oscillation of said tubular film about said cylinder; and f) applying a third gas stream over the exterior surface of said tubular film having said first diameter adjacent the extent of said predetermined distance for stabilizing and expanding said tubular film from said first diameter to a second diameter thereat, the resulting film having a thickness of from about 0.1 to about 20 mils and a void fraction of from 0.60 to about 0.75 and a density of from about 0.40 to about 0.70 g/cm$^3$, wherein the voids are in the interior of the film.

BRIEF DESCRIPTION OF THE DRAWING

The drawing schematically illustrates apparatus and a high stalk, blown film process useful to produce a paper-like film of the invention.

DETAILED DESCRIPTION OF THE INVENTION

The present invention relates to a high stalk, blown film extrusion process for making micro-voided, paper-like film. The features and advantages of the invention will be more fully understood by reference to the following detailed description, when taken in conjunction with the accompanying drawing.

The film of the invention comprises, by weight, from about 20% to about 60%, typically from about 30% to about 55%, more typically from about 40% to about 50%, of high density polyethylene having a molecular weight of at least about 200,000. The term polyethylene means ethylene homopolymers or copolymers made of ethylene and at least one other olefin monomer. High density polyethylene means a polyethylene having a density of at least about 0.940 g/cm$^3$, typically from about 0.940 to about 0.960 g/cm$^3$. The high density polyethylene typically has a molecular weight of at least about 500,000, more typically at least about 750,000, e.g. about 1,000,000 or 1,500,000. The high density polyethylene typically has a molecular weight of less than about 3,000,000, more typically less than about 2,000,000. In one embodiment, the high density polyethylene has a melt index of less than 0.2 dg/min, typically from about 0.01 to about 0.15 dg/min, more typically from about 0.02 to about 0.10 dg/min, e.g., from about 0.02 to about 0.06 dg/min. As used herein, melt index is measured by the procedures of A.S.T.M. D-1238-90b, and the density of polyethylene is measured by the procedures of A.S.T.M. D-1505-85. Mixtures or blends of high density polyethylene, with or without other polymer materials, for example, medium or low density polyethylene or polypropylene, may be used. The optimum temperature for stretching the film will depend on the particular polyethylene or blend of polyethylene selected. When stretching the film, the film temperature should be below the crystalline melting point and above the line drawing temperature. In practice, the actual film temperature is not usually measured, as described hereinafter.

The film further comprises, by weight, from about 40% to about 80%, typically from about 45% to about 70%, more typically from about 50% to about 60%, of low aspect ratio filler material. The weight ratio of the low aspect ratio filler to the high density polyethylene is at least about 0.7, typically at least about 0.8, more typically at least about 0.9, e.g., about 1.0, 1.2 or 1.5. The term "aspect ratio" refers to the ratio of particle length to particle thickness. For any given filler, the aspect ratio is the average value determined for a representative number of particles by examination through a microscope. The length is the longest dimension, measured through the center of mass of the particle. Once the length is known, it is possible to measure the dimensions of the particle in two other directions perpendicular to each other and perpendicular to the length. These two dimensions are referred to as the width and thickness of the particle, with the thickness being the smaller of the two when they are not equal. In general, the low aspect ratio fillers herein have an aspect ratio of less that about 3, typically less than about 2, more typically less than about 1.5. Fillers with low aspect ratios, i.e., tending to the ratio of 1.0, although irregular, are often described as spherical, round, or cubic. Suitable low aspect ratio fillers are selected from the group consisting of alkali metal and alkaline earth metal carbonates, sulphates and phosphates, and mixtures thereof. Examples include calcium carbonate, sodium carbonate, barium sulphate, calcium sulphate, sodium sulphate, sodium phosphate, potassium phosphate, and calcium phosphate. In one embodiment, the filler is calcium carbonate.

The particle size of the filler has an effect on the properties of the film. It is desirable that the fillers do not contain particles of excessively large size, otherwise holes or other defects may be generated during the film stretching process. The maximum particle size of the filler depends on the desired film thickness. A.S.T.M. procedure E2651-10, Standard Guide for Powder Particle Size Analysis, may be used to determine the size of the particles. When thicker films are to be produced, larger particles can be tolerated. If the average particle size of the low aspect ratio filler is too low, there is a tendency for the resulting films to have lower void fractions.

In general, it is desirable that the low aspect ratio filler has a maximum particle size less than about 50 microns. It is also desirable that at least 99.9% by weight of the filler particles pass through a 325 U.S. mesh screen (nominal mesh openings of 44 microns). The low aspect ratio filler herein has a mean particle size of from about 1 to about 25 microns, typically from about 1 to about 20 microns, more typically from about 1 to about 10 microns. A desirable range for the mean particle size, based on equivalent spherical diameter, for the low aspect ratio filler is from about 1 to about 10 microns, typically from about 3 to about 5 microns. Equivalent spherical diameter (ESD), the diameter computed for a hypothetical sphere which would have the same volume as the particle, is calculated as follows: $ESD=(6\times \text{particle volume}/\pi)^{1/3}$.

While not intending to be limited by theory, it is believed that the films of the invention have a structure with voids surrounding or adjacent to the low aspect ratio filler particles in the interior of the film. The smallest dimension of the low aspect ratio filler affects the formation of voids in the oriented film. If the particle size of the filler is too small, the voids are absent or too small to give practical paper-like films. If the particle size of the filler is too large, the film tends to have holes therein, thus destroying the integrity of the film. For smaller particle size low aspect ratio fillers, it may be desirable to add up to about 2% by weight of a $C_{10}$-$C_{24}$ organic acid, or blends thereof, before extruding the polymer-filler composition. Particularly when calcium carbonate is used, it is advantageous to add up to about 2% by weight, for example 1%, of a $C_{10}$-$C_{24}$ organic acid (e.g., coconut fatty acid, palmitic acid, or tallow fatty acid) to the composition.

The presence of microvoids in the film appears to manifest itself as an increase in opacity and whiteness of the film compared to films without microvoids. There is also a noticeable reduction in density due to the fact that the film is no longer a uniform solid structure. This reduction in density can create difficulties when comparing film samples of differing degrees of microvoiding. This may be further complicated by films that do not have smooth surfaces. For these reasons, additional measurements are used for evaluating the films.

The density of a film sample is determined by measuring the length, width and average thickness, and determining its mass. Care must be taken not to overly compress the sample when measuring the thickness. It is desirable to use a micrometer that applies only light force. After the polyethylene and low aspect ratio filler components are compounded together, the (compounded) resin density can be determined by using, for example, a density column or other suitable method. The "void fraction" for the film sample can be calculated from the following formula: Void Fraction=1−(Film density/Resin density). It should be noted that the void fraction calculated in this way takes into account internal voids and the effects of surface roughness. The films of the invention have a void fraction of from about 0.6 to about 0.75, typically from about 0.62 to about 0.72. With such a high void fraction, the films have a relatively low density, typically from about 0.40 to about 0.70 g/cm$^3$, more typically from about 0.45 to about 0.65 g/cm$^3$, e.g., from about 0.50 to about 0.60 g/cm$^3$.

"Equivalent thickness" is calculated as follows: Equivalent thickness=Thickness×(1−Void fraction). The equivalent thickness is intended to be a measure of the thickness that the film would have had if compressed into a smooth, uniform, solid layer. Except where explicitly states as "equivalent thickness", the term thickness refers to the measured thickness of the film and not the equivalent thickness.

The films of the invention can be produced at lower thicknesses, e.g., down to about 10 microns, and at higher yields, e.g., up to about 600 lbs/hr, than typically obtained using prior art processes. In various embodiments, the present invention provides one or more of the following benefits: films having low density and low gauge (thickness) at standard production rates; films having equal tensile strength at half the gauge of prior art films; films having equal moisture barrier properties at half the gauge of prior art films; and films made with increased through-put (significantly reduced lb/msi) versus prior art processes, e.g., a 100 micron thick film produced at 0.065 lb/msi versus a prior art film produced at 0.209 lb/msi, which translates into significant cost savings in the production of the film.

Films of the present invention combine the properties of both plastic and paper, specifically the moisture barrier, strength and elongation of plastic and the tear and feel of paper. The films typically have low extensibility and good flexural stiffness, die-cuttability, opacity, fold retention (good deadfold), and printability. As such, they are useful as a paper substitute and as a replacement for plastic films and paper currently used in flexible packaging and advertising signage. The films can be used in flexible wrap or bag packaging for toiletries, such as soaps, diapers, and tissues/wipes, and perishable and non-perishable food products, such as cereals, grain-based foods and snacks. The films can be laminated to fiber based materials, such as fiber board, corrugated sheeting and box containers, and provide moisture barrier properties and improved printing quality. The films can thus replace foil lining in packaging and foil used in unitized bubble packaging for food and medicinal products.

The films of the invention are thermo-degradable and photodegradable when exposed to ultraviolet light, and the inorganic filler materials return naturally to earth in powder form, thus making the films more sustainable and environmentally friendly. The films reduce usage of costly polymer resin (produced from hydrocarbon fuels) in favor of less expensive inorganic filler materials. Manufacturing the film requires less energy and no water usage compared to paper products. Manufacturing the film also requires fewer steps and less energy than most plastic films due to the heat transfer properties of the inorganic filler materials and the low melt index of the high density polyethylene.

For certain applications, the film may be used without further treatment. For other applications, it may be desirable to include various additives conventionally used in the art, such as coupling agents, lubricants, dispersant agents, antistatic agents, antioxidants, processing aids, UV stabilizers and the like. Where the film is to be printed, it may be desirable to corona treat the oriented film. For other applications, e.g. films for in-mold labels, it may be desirable to corona treat and coat the film with an antistatic agent. After coating with a heat seal layer, the films are particularly useful for in-mold labels since they comprise recyclable, high density polyethylene resins. Heat seal layers are typically polyolefin materials having lower melting points than the films of the invention. Ethylene vinyl acetate (EVA) copolymers are examples of such heat sealing layers.

The polyethylene and low aspect ratio filler materials of the invention are usually first compounded by known methods for melt blending thermoplastic polymers. For example, in a series of mixing, extruding, and milling steps, the polyethylene and low aspect ratio filler materials are compounded into pellets or granules having at least substantially homogeneous composition. In one embodiment, the materials are compounded into cylindrical shape pellets having a length and diameter of about 3-5 mm. The pellets or granules are fed into an extruder, melted and extruded into a film using methods and apparatus known in the art. The extruded film typically has a thickness of from about 50 to about 300 microns, more typically from about 200 to about 300 microns. The film is then oriented, typically biaxially, using high stalk, blown film methods and apparatus known in the art. The resulting film typically has a thickness or from about 10 to about 75 microns, more typically from about 20 to about 50 microns.

In one embodiment, the film is oriented as described in U.S. Pat. No. 4,606,879, Cerisano, incorporated herein by reference. Cerisano discloses a blown film extrusion apparatus and process for producing a stabilized, high stalk between spaced-apart tandem air rings for increasing the production rate of blown polymers, while improving the film's physical and mechanical properties. The apparatus for forming the film is constructed of means for forming a progressively advancing tubular film along a longitudinal axis, stabilizing means arranged exteriorly and interiorly of the film for preventing the oscillation of the film about the longitudinal axis over a predetermined distance by controlling the application of a gas stream over the exterior and interior surface of the film within the predetermined distance, and expanding means arranged adjacent the boundary of the predetermined distance for expanding the film thereat.

In another embodiment, the apparatus for forming the film is constructed of an extruder for supplying plastic material in a flowable state, a die arranged in advance of the extruder for forming a progressively advancing tubular film along a longitudinal axis, a primary air ring arranged adjacent the die and exteriorly of the film, the primary air ring supplying a first gas stream over the exterior surface of the film, a cylinder arranged interiorly of the film and extending along the longitudinal axis from the die, the cylinder and the interior surface of the film defining an annular region between them for receiving a second gas stream, controlling means for controlling the first and second gas streams to stabilize the film over a predetermined distance by preventing the oscillation of the film about the cylinder, and a secondary air ring arranged adjacent the boundary of the predetermined distance and exteriorly of the film, the secondary air ring supplying a third gas stream over the exterior surface of the film for expanding the film thereat.

In another embodiment, the process for forming the film comprises the steps of forming a progressively advancing tubular film along a longitudinal axis, stabilizing the film over a predetermined distance by applying a gas stream over the interior and exterior surfaces of the film to prevent the oscillation of the film about the longitudinal axis, and expanding the film adjacent the boundary of the predetermined distance.

In yet another embodiment, the process comprises the steps of extruding a progressively advancing tubular film about a cylinder arranged along a longitudinal axis, applying a first gas stream over the exterior surface of the film, applying a second gas stream over the interior surface of the film within an annular region formed between the cylinder and the interior surface of the film, controlling the velocity and volume flow rate of the first and second gas streams over a predetermined distance to stabilize the film by preventing the oscillation of the film about the cylinder, and applying a third gas stream over the exterior surface of the film adjacent the boundary of the predetermined distance for expanding the film thereat.

Referring now to the drawing, there is shown a high stalk blown film extrusion apparatus generally designated by reference numeral 100. The extrusion apparatus 100 includes an extruder 102 having a supply hopper 104 containing a polymer 106 (typically compounded granulates of the polyethylene-filler material, or mixtures thereof, optionally including additives as described below) to be blown into a thin film by the extrusion apparatus. The polymer 106 is heated to a molten state within the extruder 102 and forced under high pressure through an extrusion die 108. The extrusion die 108 is circular in shape and has an annular opening through which a tubular film 110 of polymer in a semi-molten state is progressively advanced. The initial thickness of the tubular film 110 is determined by the size of the annular opening of the extrusion die 108. A primary air ring 112 is arranged adjacent the extrusion die 108 and surrounding the exterior of the tubular film 110. The primary air ring 112 is of the type known as a single lip air ring which prevents the performance of expansion work on the tubular film. The primary air ring 112 is connected to an air blower 114 via a conduit 116. Arranged between the air blower 114 and primary air ring 112 is a control valve 118 and a temperature control unit 120. The control valve 118 is adapted for controlling the velocity and volume flow rate of air from the air blower 114 to an opening 122 provided in the primary air ring 112. The opening 122 is constructed and arranged for discharging a continuous stream of air at uniform velocity and uniform rate in a direction parallel to the external surface of the tubular film 110.

A cylindrical mandrel 124 is positioned centrally overlying the extrusion die 108 and arranged along the longitudinal axis of the tubular film 110. The mandrel 124 is constructed to have a smooth uninterrupted exterior surface which defines an annular region 126 with the interior surface of the tubular film 110 in the range of 0.125-1.4 inches, typically in the range of 0.125-0.5 inches, and in one embodiment, less than one-quarter inch. A passageway 128 is provided internally of the mandrel 124 and communicates between the interior region 130 of the blown film 132 and a conduit 134 arranged underlying the extrusion die 108. The conduit 134 is connected to an exhaust blower 136 which communicates with the surrounding atmosphere. A control valve 138 is positioned in advance of the exhaust blower 136 to control the rate of withdrawal of air from the interior region 130 of the blown film 132. Optionally, a plurality of stabilizing guides 140 are positioned about the exterior of the mandrel 124 and extend into the annular region 126 to provide a restricted passageway 142. The guides 140 are arranged about the mandrel 124 at a location where the tubular film 110 has attained sufficient mechanical strength by its partial solidification to prevent damage thereto in the event of contact with the guides. To this end, the guides 140 are provided with a smooth uninterrupted exterior surface to prevent snagging of the tubular film 110. The guides 140 provide for increased stabilization of the tubular film 110 by locking the tubular film thereat, as described hereinafter.

Air is supplied over the interior surface of the tubular film 110 within the annular region 126 by a single annular nozzle 144 arranged within the annular region overlying the extrusion die 108. The nozzle 144 is arranged such that the discharged air flows in an upward direction parallel to the interior surface of the tubular film 110. An air blower 146 supplies air to the nozzle 144 through a conduit 148. A control valve 150 and temperature control unit 152 are provided within the conduit 148 between the air blower 146 and nozzle 144. The control valve 150 and temperature control unit 152 function in the same manner as the control valve 118 and temperature control unit 120 of the primary air ring 112. The velocity and volume flow rate of air from the air blower 146 is controlled by the control valve 150, while the temperature of the air is controlled by the temperature control unit 152. As described, the temperature, the velocity and volume flow rate of a stream of air flowing in a parallel direction over the interior and exterior surfaces of the tubular film 110 may be controlled.

A secondary air ring 154 is arranged spaced-apart in tandem with the primary air ring 112. The secondary air ring 154 is arranged a predetermined distance above the primary air ring 112 to define the extent of the tubular film 110 over which the tubular film is stabilized. The secondary air ring 154 can be adjusted upwardly and downwardly by its support upon height adjustment member 156 as shown. The secondary air ring 154 is located adjacent the predetermined distance over which the tubular film 110 is stabilized to provide a location for film expansion. The secondary air ring 154 is of the dual lip type adapted to perform substantial expansion work upon the tubular film 110 to provide the blown film 132. The secondary air ring 154 is provided with a pair of spaced-apart openings 158, 160 for the discharge of air at a high velocity and high volume rate as to opening 158 and at a high velocity, low volume rate as to opening 160 to create a negative pressure adjacent the exterior surface of the tubular film 110 to perform the required expansion work. Air is supplied to the secondary air ring 154 by an air blower 162 connected to a conduit 164. A control valve 166 and temperature control unit 168 are arranged within the conduit 164 between the air blower 162 and secondary air ring 154. The control valve 166 controls the velocity and volume flow rate of air being discharged along the exterior surface of the tubular film 110 by the secondary air ring 154, while the temperature control unit 168 controls the temperature of the discharged air. Thus, the primary air ring 112 is adapted for stabilizing the tubular film 110, while the secondary air ring 154 is adapted for expansion of the tubular film to provide the blown film 132. Although the primary air ring 112 performs a modest amount of controlled cooling of the tubular film 110, the primary cooling function is performed by the secondary air ring 154.

The extrusion apparatus 100 provides for increased stabilization of the tubular film 110 over a predetermined distance by the use of high velocity, low volume flow rate of air discharged over both the interior and exterior surfaces of the tubular film between the tandemly arranged primary air ring 112 and secondary air ring 154. The natural venturi vector forces keep the external air next to the exterior surface of the tubular film 110, while the mandrel 124 maintains the low volume flow rate of air within the annular region 126 at a sufficiently high velocity to keep the tubular film from oscillating about its longitudinal axis. The guides 140 prevent buffeting and actually make gentle contact with the solidified inside surface of the tubular film 110. The secondary air ring 154, being characterized as a high intensity cooling device, provides intensive cooling and expansion of the tubular film 110 at a location where desired, that is, providing the tubular film with a predetermined stalk height which is stabilized in accordance with the present invention. The velocity of air inside the high stalk, outside the high stalk and at the high intensity cooling and expansion area, i.e., the secondary air ring 154, are separately controlled to balance and stabilize the tubular film 110 and blown film 132.

The extrusion apparatus 100 is adapted to manufacture blown film from a variety of high molecular weight polymers. In producing films of such material, solid polymer is provided in the supply hopper 104 to be extruded in a molten state through the extrusion die 108 by the extruder 102. The thus formed tubular film 110 is stabilized over a predetermined height by the application of high velocity, low volume flow rate of air over the interior and exterior surfaces of the tubular film. The primary air ring 112 applies such a stream of air over the exterior surface of the tubular film 110 at a controlled temperature by temperature control unit 120 and at a controlled rate by control valve 118.

Similarly, a stream of air is applied over the interior surface of the tubular film 110 by the annular nozzle 144 at a controlled temperature by temperature control unit 152 and at a controlled rate by control valve 150. The high velocity of the air stream over the interior and exterior surfaces of the tubular film stabilizes the film by preventing its oscillation about the mandrel 124 and about its longitudinal axis. The application of a low volume flow rate of air results in modest cooling of the unexpanded tubular film, thereby allowing for control of the stalk height to a predetermined distance.

As a result of this created stalk height, the amount of machine direction drawdown of the tubular film 110 takes place at a reduced rate over that of conventional tubular film extrusion processes. This permitted relaxation of the polymer stresses within the high stalk provides a uniformly stressed film for expansion having better uniformity of thickness and physical and mechanical properties. In addition, the high stalk height allows for randomization and interweaving of the long polymer molecules and the low aspect ratio filler, rather than keeping them aligned parallel to the extrusion direction. This randomization and interweaving gives the blown film 132 improved tensile and tear strength properties and creates micro-voids in the film. In addition, by controlling the temperature of the air streams being applied over the exterior and interior surfaces of the tubular film 110, the film temperature over the high stalk may be maintained at an optimum temperature for ultimate blowing by the secondary air ring 154, and while being stabilized. This stabilization of the high stalk is further enhanced by the guides 140 which create the narrow passageways 142 to increase the velocity of air flowing in the annular region 126. This increased velocity of air has the tendency of locking the tubular film 100 about the guides 140, thereby increasing the stabilization of the tubular film over the predetermined distance of the thus created high stalk.

The size of the bubble of the blown film 132 is controlled primarily by the exhaust blower 136 and control valve 138. Generally, under steady state operation, the mass in of air via air blower 146 is equal to the mass of air being extracted from the interior region 130 by the exhaust blower 136 through the passageway 128 extending through the mandrel 124. In order to increase or decrease the size of the blown film 132, the internal pressure within the interior region 130 is momentarily increased or decreased, so as to affect the size of the blown film 132, which size is sensed by means of sonar sensors 170. Once the blown film 132 has achieved its predetermined size, the mass in and mass out of air within the interior region 130 is again balanced for steady state operation. The tubular film 110 is expanded and intensely cooled adjacent the frost line 172 in a conventional manner using the secondary air ring 154.

As described, the extrusion apparatus 100 and method of manufacturing blown tubular film provide for increased bubble stability, improved gauge uniformity, reduced gauge standard deviation, improved optical properties, improved impact strength, improved tear strength, improved tensile strength, improved down gauging capability, and increased output.

After the blown film 132 is formed, the film may be further processed by various means known in the art. For example, the film may be processed as shown in FIG. 2 of U.S. Pat. No. 6,280,680, Liang, incorporated herein by reference. In one embodiment, one end of the film 132 is drawn by a leading roller, such as shown in FIG. 2 of the Liang patent. The rotation speed of the leading roller is controlled so that the film 132 is substantially air-tight. The rotating speed of the leading roller, the amount of the extruded materials from the extruder 102, and the thickness of the film 132 are suitably controlled so that the film is inflated to a desired lay flat width relative to the blow ratio and die diameter at a distance of about 1000 mm to about 1700 mm from the extrusion die 108. The purpose of the inflation and drawing is to simultaneously stretch the film 132 in two directions, i.e., latitudinally and longitudinally, resulting in a paper-like film having a structure with two dimensional strength. Under inflation, the density of the paper-like film can be reduced from that of the combination of the raw materials, about 2 $g/cm^3$ to about 0.5 $g/cm^3$. Because the drawing force from the leading roller, the film 132 is drawn into a folding means provided between the leading roller and a cooling means so that the paper-like film is symmetrically folded into a folded flat paper. The purposes of the leading roller include drawing the initially formed film 132 with a low rotation speed so that the air from the cooling means is evenly blown thereto and stabilizing the film 132, and maintaining the film air-tight so that it is evenly inflated. Also, the rotation speed of the leading roller is a factor in the longitudinal stretch and thickness of the paper-like film. Of course, the rotation speed should be suitably adjusted to comply with the amount of extruded materials coming from the extruder 102. The folded paper typically passes a cutting means so that the folded paper is cut, e.g., into two sheets of paper. The two resulting sheets of the paper may be subjected to treatment of a surface corona and better adhesion can be obtained therefrom. The paper may then be collected on a roll. During the process, the thickness of the paper can be suitably controlled within a range from about 25 microns to about 75 microns, the width can be about 35-60 inches (about 0.9 m to 1.5 m), and the density can be about 0.4 $g/cm^3$ to about 0.7 $g/cm^3$.

The present invention may also be used in a process for the manufacture of a double-layered paper, triple-layered paper, or higher layered paper, such as disclosed in U.S. Pat. No. 6,280,680, Liang. Such layered papers can be used for printing, packaging, and decoration, etc. Each layer can be designed with different colors as required by adding different pigments thereto. Single-layered papers, double-layered papers, triple-layered papers, and even papers having more than three layers, each independently having a thickness of from about 30 to about 150 microns and independently having the same or different components, can be laminated by a laminating machine, such as shown in FIG. 8 of the Liang patent, to form a two-layered laminated paper or a three-layered laminated paper having a thickness of from about 150 to about 450 microns.

The papers manufactured according to the present invention can be applied to the field of printing, packaging, and decoration. They can be used directly without any pretreatment or with suitable pretreatment, for instance glossy surface treatment and hazy surface treatment, for special purposes. Both water borne coatings and non-water borne coatings can be used to coat the papers manufactured using the present invention. The formulation of water borne coating may be comprised of acrylic resin, isopropanol, polyvinyl alcohol, clays, an antistatic agent, 28% aqueous ammonia, pure water, and vinyl acetate.

The following Table I discloses ranges for various operating parameters in producing blown tubular film of the invention using the apparatus and process described above. The operating parameters are based on the use of a 300 mm (11.8 inches) diameter extrusion die. The mass flow, inside air flow, outside air flow and secondary air ring flow are directly proportional to the die diameter. Thus, for a 200 mm (8 inch) diameter extrusion die, the mass flow would be 200-1200 lb/hr, the inside air flow would be 40-1200 CFM, the outside air flow would be 40-1600 CFM, and the secondary air ring flow would be 120-4000 CFM.

TABLE I

| | UNITS | RANGE |
|---|---|---|
| Resin Melt Index | dg/min. | 0.02-0.15 |
| Melt Temp. | ° F. | 375-450 |
| Melt Pressure | Psi | 7000-9000 |
| Mass Flow | Lb/hr | 300-900 |
| Melt Tube Dia. | Inches | 3.2 to 6 |
| Melt Tube Thick | Mils | 20 to 200 |
| Inside Air Flow | CFM | 60-1800 |
| Inside Air Velocity | FPM | 1,000-24,000 |
| Inside Air Temp. | ° F. | −20 to 300 |
| Outside Air Flow | CFM | 60-2400 |
| Outside Air Velocity | FPM | 1,000-24,000 |
| Outside Air Temp. | ° F. | −20 to 300 |
| Sec. Air Ring Flow | CFM | 180-6000 |
| Sec. Air Ring Velocity | FPM | 2,000-24,000 |
| Sec. Air Ring Temp. | ° F. | −20 to 150 |
| Blow Up Ratio | — | 0.8 to 9.0 |
| Film Thickness | Mils | 0.1 to 20 |
| Film Speed | FPM | 30 to 1,000 |
| Melt Tube Height/Die dia. | — | 1-20 |

Micro-voided, blown tubular films of the invention comprising, by weight, 50% high density polyethylene (molecular weight about 1.0 to 1.5 million) and 50% calcium carbonate (mean particle size about 3-5 microns) are produced using the above described apparatus and process under the following conditions.

TABLE II

| | | EXAMPLES | | |
|---|---|---|---|---|
| | UNITS | I | II | III |
| Resin Type | | HDPE | HDPE | HDPE |
| Low Aspect Ratio filler | | CaCO3 | CaCO3 | CaCO3 |
| Resin Melt Index | dg/min. | .06 | .04 | .02 |
| Melt Temp. | ° F. | 450 | 450 | 450 |
| Die Diameter | mm | 300 | 200 | 150 |
| Melt Pressure | Psi | 8,000 | 6,000 | 4,000 |
| Mass Flow | Lb/hr | 800 | 550 | 300 |
| Inside Air Flow | CFM | 900 | 600 | 300 |
| Inside Air Temp. | ° F. | 45 | 45 | 45 |
| Outside Air Flow | CFM | 1200 | 800 | 400 |
| Outside Air Temp. | ° F. | 45 | 45 | 45 |
| Sec. Air Ring Flow | CFM | 3000 | 2000 | 1000 |
| Sec. Air Ring Temp. | ° F. | 45 | 45 | 45 |
| Blow Up Ratio | — | 2.8 | 2.8 | 2.8 |
| Film Thickness | Microns | 38 | 38 | 38 |
| Film Speed | FPM | 200 | 150 | 100 |
| Void Fraction | — | 0.62 | 0.62 | 0.62 |

Other films of the invention are obtained when the above composition comprises, by weight, 40% high density polyethylene (molecular weight about 1.0 to 1.5 million) and 60% calcium carbonate (mean particle size about 3-5 microns), or 30% the high density polyethylene and 60% calcium carbonate, or when about 1% of $C_{10}$-$C_{24}$ organic acid is added to the composition. For example, one film comprises about or 28% the high density polyethylene, 70% calcium carbonate, and 1 to 2% of additives, such as the $C_{10}$-$C_{24}$ organic acid. Other films of the invention are obtained when 10% or 20% medium density polyethylene or polypropylene is added to the above composition, or when the calcium carbonate has a mean particle size of about 10 microns or is replaced with barium sulphate, sodium sulphate, sodium phosphate, or calcium phosphate. Other films are obtained when the above films have a void fraction of about 0.65, 0.70 or 0.75, or a density of about 0.40, 0.50, or 0.65 g/cm$^{3'}$, and a thickness of about 10, 25 or 50 microns.

Although the invention has been described with reference to particular embodiments, it is to be understood that these embodiments are merely illustrative of the principles and application of the invention, and that the invention may be carried out in other, ways than those set forth herein. For example, air from the interior region 130 of the blown film 132, which is supplied by air blower 146, could be recirculated through conduits 134, 148 thereby eliminating the exhaust blower 136 and control valve 138. Therefore, numerous modifications may be made in the illustrative embodiments and that other arrangements may be devised without departing from the spirit and scope of the invention as defined by the appended claims.

What is claimed is:

1. A process for making a micro-voided film, comprising:
   a) compounding into pellets or granules having an at least substantially homogeneous composition comprising, by weight, i) from about 20% to about 60% of high density polyethylene having a molecular weight of at least about 500,000 and a melt index of less than 0.2 dg/min, and ii) from about 40% to about 80% of low aspect ratio filler having a mean particle size from about 1 to about 25 microns, wherein the weight ratio of the low aspect ratio filler to the polyethylene is at least about 0.7;
   b) extruding the composition into a film having a thickness of from about 20 to about 200 mils; and
   c) orienting said extruded film using a high stalk, blown film process, the resulting film having a thickness of from about 0.1 to about 20 mils and a void fraction of from 0.60 to about 0.75 and a density of from about 0.40 to about 0.70 g/cm$^3$, wherein the voids are in the interior of the film.

2. The process according to claim 1 wherein the resulting film has a thickness of from about 20 to about 50 microns and a void fraction of from about 0.62 to about 0.72.

3. The process according to claim 1 wherein the composition comprises from about 30% to about 50% of the high density polyethylene.

4. The process according to claim 1 wherein the high density polyethylene has a melt index of from about 0.02 to about 0.06 dg/min.

5. The process according to claim 1 wherein the composition comprises from about 50% to about 60% by weight of the low aspect ratio filler.

6. The process according to claim 1 wherein the low aspect ratio filler is calcium carbonate.

7. The process according to claim 1 wherein the calcium carbonate has a mean particle size of from about 3 to about 5 microns.

8. The process according to claim 1 wherein the extruded film is biaxially oriented, first in the machine direction and then in the transverse direction.

9. The process according to claim 1 wherein the extruded film has a thickness of from about 50 to about 150 microns and is biaxially oriented, first in the machine direction and then in the transverse direction, and the resulting film has a thickness of from about 10 to about 75 microns.

10. A process for making a micro-voided film, comprising:

a) compounding into pellets or granules having an at least substantially homogeneous composition comprising, by weight, i) from about 20% to about 60% of high density polyethylene having a molecular weight of at least about 500,000 and a melt index of less than 0.2 dg/min, and ii) from about 40% to about 80% of low aspect ratio filler having a mean particle size from about 1 to about 25 microns, wherein the weight ratio of the low aspect ratio filler to the polyethylene is at least about 0.7;
b) extruding the composition into a progressively advancing unexpanded tubular film having a thickness of from about 20 to about 200 mils and having a substantially uniform first diameter about a cylinder arranged along a longitudinal axis over a predetermined distance;
c) applying a first gas stream over the exterior surface of said tubular film;
d) applying a second gas stream over the interior surface of said tubular film within an annular region formed between said cylinder and the interior surface of said tubular film;
e) controlling the velocity and volume flow rate of said first and second gas streams over said unexpanded tubular film over said predetermined distance for stabilizing said tubular film by preventing the oscillation of said tubular film about said cylinder; and
f) applying a third gas stream over the exterior surface of said tubular film having said first diameter adjacent the extent of said predetermined distance for stabilizing and expanding said tubular film from said first diameter to a second diameter thereat, the resulting film having a thickness of from about 0.1 to about 20 mils and a void fraction of from 0.60 to about 0.75 and a density of from about 0.40 to about 0.70 g/cm$^3$, wherein the voids are in the interior of the film.

11. The process of claim 10 wherein said stabilizing includes applying within said predetermined distance said first gas stream at a sufficiently high velocity, low volume flow rate over the exterior surface of said film and said second gas stream at a sufficiently high velocity, low volume flow rate over the interior surface of said film to prevent the oscillation thereof.

12. The process of claim 11 further including controlling the temperature of said first and second gas streams.

13. The process of claim 12 further including exhausting at a controlled rate at least a portion of said second gas stream from the interior of said film through a passageway provided within said cylinder.

14. The process of claim 13 wherein said stabilizing includes applying said gas stream over the interior surface of said film in a direction parallel thereto and applying said gas stream over the exterior surface of said film in a direction parallel thereto.

* * * * *